United States Patent [19]
Whalen

[11] Patent Number: 5,460,429
[45] Date of Patent: Oct. 24, 1995

[54] INERTIA LATCH ASSEMBLY FOR SEAT HINGE MECHANISM

[75] Inventor: John F. Whalen, Macomb, Mich.

[73] Assignee: Fisher Dynamics Corporation, St. Clair Shores, Mich.

[21] Appl. No.: 188,917

[22] Filed: Jan. 31, 1994

[51] Int. Cl.⁶ ........................................................ B60N 2/02
[52] U.S. Cl. .................................. 297/378.11; 297/378.12
[58] Field of Search ............................ 297/378.11, 378.12

[56] References Cited

U.S. PATENT DOCUMENTS

| | | |
|---|---|---|
| Re. 31,741 | 11/1984 | Strowick et al. . |
| 2,737,229 | 6/1956 | Semar . |
| 2,864,432 | 12/1958 | Limberg . |
| 2,873,794 | 2/1959 | Leslie et al. . |
| 3,405,971 | 10/1968 | Kobrehel . |
| 3,514,155 | 5/1970 | Close . |
| 3,549,202 | 12/1970 | Boschen et al. . |
| 3,628,831 | 12/1971 | Close . |
| 4,010,979 | 3/1977 | Fisher et al. . |
| 4,045,079 | 8/1977 | Arlauskas et al. . |
| 4,082,353 | 4/1978 | Hollowell . |
| 4,143,913 | 3/1979 | Rumpf . |
| 4,147,386 | 4/1979 | Stolper . |
| 4,165,128 | 8/1979 | Strowick et al. . |
| 4,219,234 | 8/1980 | Bell . |
| 4,223,946 | 9/1980 | Kluting . |
| 4,252,370 | 2/1981 | Kluting et al. . |
| 4,294,488 | 10/1981 | Pickles . |
| 4,318,569 | 3/1982 | Bilenchi et al. . |
| 4,365,837 | 12/1982 | Mizelle . |
| 4,390,208 | 6/1983 | Widmer et al. . |
| 4,402,547 | 9/1983 | Weston et al. . |
| 4,429,919 | 2/1984 | Klueting et al. . |
| 4,518,190 | 5/1985 | Klüting et al. . |
| 4,591,207 | 5/1986 | Nithammer et al. . |
| 4,634,182 | 1/1987 | Tanaka . |
| 4,846,526 | 7/1989 | Allen . |
| 4,909,571 | 3/1990 | Vidwans et al. . |
| 4,928,374 | 5/1990 | Allen . |
| 4,978,170 | 12/1990 | Pelz et al. . |
| 5,163,735 | 11/1992 | Aljundi . |
| 5,163,736 | 11/1992 | Aljundi . |
| 5,248,184 | 9/1993 | Morris . |
| 5,265,937 | 11/1993 | Allen . |

Primary Examiner—Peter R. Brown
Assistant Examiner—Anthony Barfield
Attorney, Agent, or Firm—Harness, Dickey & Pierce

[57] ABSTRACT

An inertia-sensitive seat hinge mechanism allows rotation of a seatback relative to a seat bottom under normal use conditions and yet prevents such rotation in response to deceleration forces exceeding a predetermined threshold level. The seat hinge mechanism includes a lower hinge member connected to the seat bottom and an upper hinge member connected to the seatback and an inertia-sensitive latch assembly. The inertia-sensitive latch assembly includes a component carried by the upper member which defines first and second stop surfaces. The first stop surface limits rotation of the upper hinge member in one direction. An inertial actuator is rotatable with respect to the upper hinge member and includes an engaging finger for engaging the second stop surface when the upper hinge member attempts to rotate in an opposite direction due to exertion of the predetermined deceleration forces thereon. The inertial actuator also includes a projection located adjacent a center of rotation. Moreover, the inertial actuator has a center of gravity spaced from the center of rotation. A release lever engages the projection to rotate the inertial actuator into a normal position against the component when the upper hinge member is fully rotated against the first stop surface. A biasing device, located on the component, biases the release lever to release the projection when the upper hinge member is rotated in the opposite direction and allows the inertial actuator to rotate by gravity if the predetermined deceleration forces are not present.

17 Claims, 3 Drawing Sheets

INERTIA LATCH ASSEMBLY FOR SEAT HINGE MECHANISM

BACKGROUND OF THE INVENTION

1. Technical Field

This invention relates generally to seat hinge mechanisms for folding-type vehicle seats and, more particularly, to such a seat hinge mechanism having an inertia-sensitive latch assembly which permits the seatback to be folded forward during normal use but which locks to prevent folding when the vehicle is subjected to deceleration forces exceeding a predetermined threshold level.

2. Discussion

Most two-door passenger-type motor vehicles have a rear seat area or luggage compartment area that is accessible by forwardly pivoting or folding a seatback portion of the front seat. Current U.S. Federal Motor Vehicle Safety Standards require the front vehicle seat to be equipped with a latching mechanism for inhibiting forward rotation of the foldable seatback when deceleration forces exceed a predetermined threshold level which may occur, for example, during an emergency heavy braking condition or a frontal collision.

In the past, the seat hinge mechanisms associated with some folding-type vehicle seats were provided with a manually-activated seatback latching mechanism. As an alternative, other seat hinge mechanisms incorporate an inertia-sensitive latching mechanism which enables a seatback to be folded forward without significant resistance when the vehicle is not subject to the above-mentioned predetermined deceleration forces. However, when the predetermined deceleration forces are present, the inertia-sensitive latching mechanism is activated for latching the seat hinge mechanism to prevent forward pivotal movement of the seatback.

In many commercially available vehicle seating arrangements, the inertia-sensitive type seat hinge mechanism further provides a mechanism for positioning the inertia-sensitive actuator or element in an engaged position when the seatback is folded to its rearmost position. For such mechanisms, the inertia-sensitive actuator is free to move between engaged and released positions once the seatback is folded several degrees forward. When deceleration loads above the predetermined level are present, the inertia-sensitive actuator remains in an engaged position, thus preventing forward rotation of the seatback. Such seat hinge mechanisms cause the inertia-sensitive element to be continuously moved between its engaged and released positions, thereby reducing the likelihood that corrosion, foreign matter, etc. will interfere with the free movement thereof.

A known disadvantage associated with many conventional seat hinge mechanisms having the above-discussed features, is that they present an edge surface which protrudes toward the rear seat area when the front seatback is rotated forward. Thus, the rear seat occupants could possibly contact the protruding edge surface while entering or egressing the rear seat area. Accordingly, it is desirable to provide a seat hinge mechanism which does not interfere with access to the rear compartment area. In addition to the above, seat hinge mechanisms having an inertia-sensitive latching device are required to have an emergency release that is operable to release the inertia-sensitive actuator, thereby enabling a rear seat occupant to escape from the vehicle by releasing the seatback in an emergency situation. Emergency releases typically include a manually-operable lever which forcibly displaces the inertia-sensitive actuator into the released position. Since the emergency release must be accessible to the rear seat occupant, the emergency release lever typically protrudes rearwardly from the seatback. In order to simplify trimming of the seatback, it is desirable to locate the emergency release lever at a position near the hinge or pivot between the seatback and the seat bottom.

Another disadvantage associated with conventional seat hinge mechanisms having the above-discussed features is that they require the seatback to be lifted and the emergency release lever to be actuated simultaneously to forwardly pivot the seatback. Such actuation requires a passenger to use both hands which can be inconvenient or impossible, especially during emergency situations. Therefore, a hinge mechanism incorporating an inertial latching mechanism which releases by raising the emergency release lever without also lifting the seatback is desirable.

Although inertia-sensitive seat hinge mechanisms incorporating some of the above-noted features are commercially available and perform satisfactorily for this intended purpose, a need exists to provide continuous improvement in this field of technology for reducing overall system complexity and cost while concomitantly enhancing operational reliability and durability.

SUMMARY OF THE INVENTION

Accordingly, the present invention is directed to providing an improved seat hinge mechanism of the type having an inertia-sensitive latch assembly. In operation, the inertia-sensitive seat hinge mechanism allows rotation of a seatback relative to a seat bottom under normal use conditions and yet prevents such rotation in response to deceleration forces exceeding a predetermined threshold level.

According to a preferred embodiment, the seat hinge mechanism includes an upper hinge member connected to the seatback, a lower hinge member connected to the seat bottom, and an inertia-sensitive latch assembly. The inertia-sensitive latch assembly includes a component carried by the upper hinge member and which defines first and second stop surfaces. The first stop surface limits rotation of the upper hinge member in one direction. An inertial actuator is rotatable with respect to the upper hinge member and includes an engaging finger for engaging the second stop surface when the upper hinge member attempts to rotate in an opposite direction due to exertion of the predetermined deceleration forces thereon. The inertial actuator further includes a projection offset from a center of rotation. The inertial actuator has a center of gravity spaced from the center of rotation. A release lever engages the projection to rotate the inertial actuator into a normal position against the component when the upper hinge member is fully rotated against the first stop surface. A biasing device, located on the component, biases the release lever to release the projection when the upper hinge member is rotated in the opposite direction and allows the inertial actuator to rotate by gravity if the predetermined deceleration forces are not present.

In another feature of the present invention, the release lever includes a first bore for receiving a first pin connected to the upper hinge member.

In yet another feature of the invention, the release lever is rotatable between first and second positions relative to the upper hinge member and includes a cam for receiving a second pin projecting from the upper hinge member. The cam includes first and second edge surfaces defining the first and second positions.

In yet another feature of the invention, the release lever includes an elongated extension defining a C-shaped recess having an edge surface which engages the inertial actuator projection to rotate the inertial actuator into the normal position.

In still another feature of the invention, the engaging finger and the second stop surface form a gap therebetween when the seat hinge mechanism is in the normal position to allow the release lever to be raised without also lifting the seatback.

In another feature of the invention, the component includes an extension defining the first and second stop surfaces on opposite sides thereof. In addition, the biasing device includes a second bore formed in the extension between the first and second stop surfaces for receiving a biasing pin.

Additional benefits and advantages of the present invention will become apparent to those skilled in the art after studying the following specification and appended claims taken in conjunction with the accompanying drawings.

DESCRIPTION OF THE PREFERRED EMBODIMENT

Figure 1:
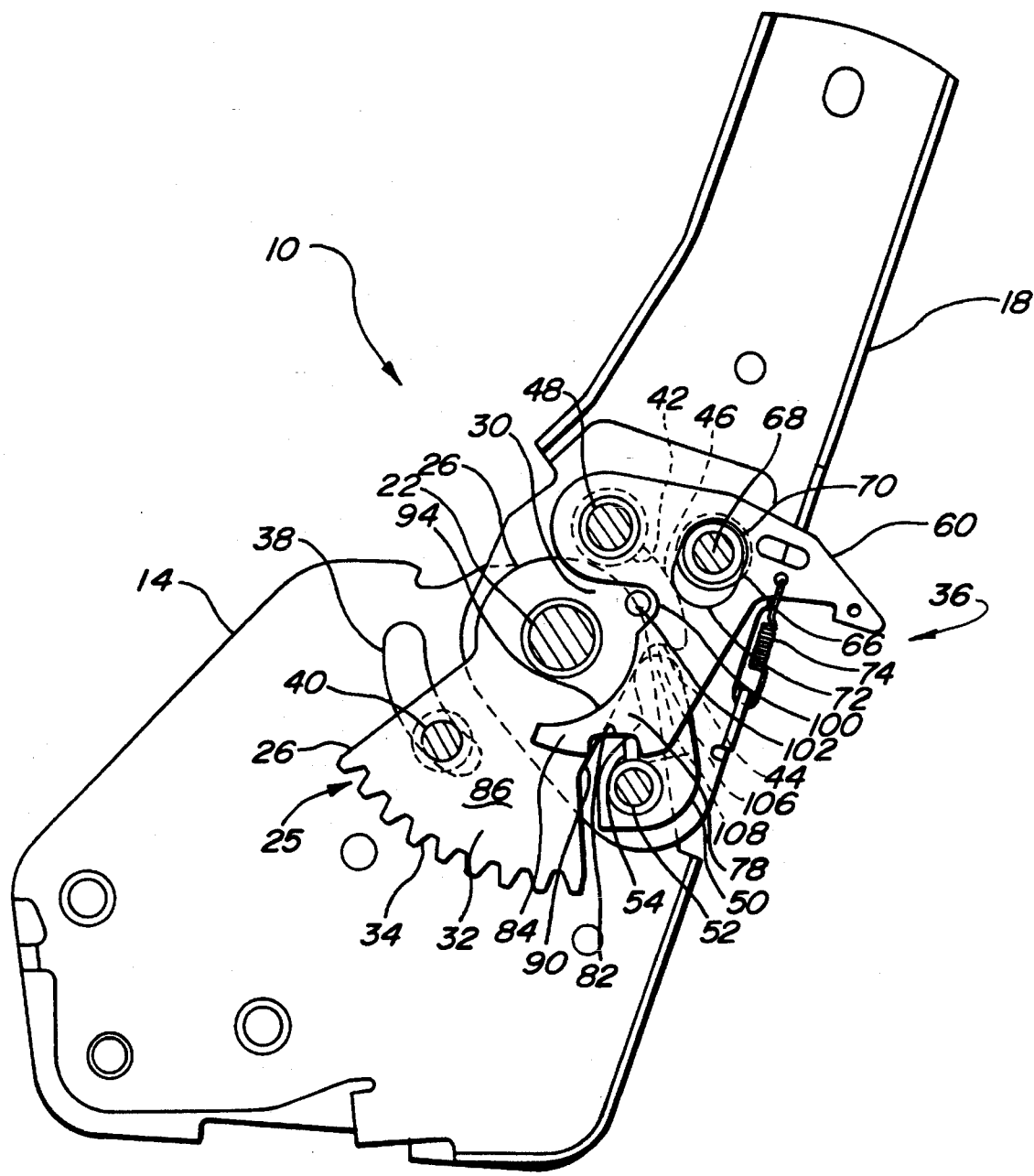
FIG. 1 is a side elevational view of a seat hinge mechanism in accordance with a preferred embodiment of the present invention shown in a normal position.

A motor vehicle seat hinge mechanism 10 according to a preferred embodiment of the present invention and illustrated in the drawings is intended to be positioned at the right hand side of a motor vehicle's front passenger seat (not shown). A seat hinge mechanism for the left hand side of a motor vehicle's driver seat would preferably be a mirror image of the passenger hinge 10 disclosed herein. Seat hinge mechanism 10 includes a lower hinge member 14 which is adapted to be fixedly attached to a conventional seat bottom frame structure (not shown) and an upper hinge member 18 which is adapted to be fixedly attached to a conventional seatback frame structure (not shown). As is known, the seat bottom frame and seatback frame are adapted to hinge an upholstered seat cushion and an upholstered seatback cushion, respectively. As will be described in greater detail, upper hinge member 18 is hinged for pivotable movement with respect to lower hinge member 14 about a pivot pin 22. Moreover, each of upper and lower hinge members 14 and 18 can be fabricated by matingly attaching a pair of flanged brackets or plates using rivets, welding, etc., whereby the plates define a space therebetween to accommodate the additional components described below.

Seat hinge mechanism 10 is shown to incorporate portions of a reclining mechanism 25 which enables the rearward tilted position of upper hinge member 18 to be controllably varied with respect to lower hinge member 14 to provide an adjustable reclining feature. However, this reclining feature is optional since the novel aspects of the present invention may be provided in seat hinge structure without the reclining feature. Numerous reclining mechanisms are known to those skilled in the art. One example of a reclining mechanism is described in commonly owned U.S. Pat. No. 4,733,912 which issued to Secord on Mar. 29, 1988, and which is hereby expressly incorporated by reference.

While not directly affecting the unique features of seat hinge mechanism 10 to be described and claimed, a brief description of a reclining mechanism 25 is warranted. Reclining mechanism 25 includes a toothed plate or quadrant 26, which establishes the angular position of upper hinge member 18 with respect to lower hinge member 14 (and the seat bottom) during use. Quadrant 26 is also rotatable about pivot pin 22 and includes upper and lower portions 30 and 32, respectively. Lower portion 32 of quadrant 26 defines a curved toothed rack 34 which typically meshes with gears (not shown) of a gearset providing a torque reduction to limit the torque required to restrain movement of quadrant 26 and to selectively permit clockwise rotation of upper hinge member 18 about pivot pin 22. Reference is again directed to the Assignee's above-noted U.S. Pat. No. 4,733,912 for further description of a manually-operated actuation mechanism controlling the selective release and locking of quadrant 26. One or more cam surfaces 38 can be provided in lower hinge member 14 for receiving pin(s) 40 that are connected to quadrant 26 adjacent curved toothed rack 34.

In accordance with a principle function of the present invention, a unique and improved inertia latch assembly 36 is provided in association with hinge mechanism 10. More particularly, a tilt surface 42 and a stop surface 44 are formed by an extension 46 on upper portion 30 of quadrant 26. A pin 48 connected to upper hinge member 18 rests against tilt surface 42, for example, when a passenger sits in the seat. In addition, an inertial actuator 50 is hinged for rotation about a pin 52 that is affixed to lower hinge member 14 and is shown to include a radial projection 54. Moreover, inertial actuator 50 has a center of gravity above and horizontally spaced from its center of rotation, as defined by pin 52.

With continued reference to the drawings, seat hinge member 10 is also shown to include an emergency release lever 60 which is hinged for pivotable movement about pin 48. A cam slot 66 formed in release lever 60 receives a pin 68 extending from upper hinge member 18 to restrict pivotal movement of emergency release lever 60 in response to engagement of upper and lower edges 70 and 72 of cam surface 66 with pin 68. Pin 68 normally rests against upper edge 70 of cam surface 66 due to the biasing force exerted by a spring 74 that is attached at one end to lower hinge member 18 and at an opposite end to emergency release lever 60. Emergency release lever 60 includes an elongated, generally boot-shaped extension 78 which has a C-shaped recess 82 formed in its distal end and within which radial projection 54 is located. A forwardly extending tip or end portion 84 of boot-shaped extension 78 maintains the emergency release lever 60 adjacent to a side surface 86 of quadrant 26 and prevents emergency release lever 60 from catching on a rear edge 90 thereof during relative movement therebetween. Emergency release lever 60 also includes an arcuate surface 94 which terminates in a U-shaped recess 100 formed in an upper portion of boot-shaped extension 78. A pin 102 extending from quadrant extension 46 between tilt surface 42 and stop surface 44 is adapted for retention within recess 100 and sliding movement along arcuate surface 94 as will be described.

When the seatback portion of the vehicle seat is not forwardly folded (i.e., in an "upright" position), seat hinge mechanism 10 is positioned as shown in FIG. 1. In this position, reclining mechanism 25 normally prevents rearward reclining movement of quadrant 26. As such, pin 48, which is connected to upper hinge member 18, rests against tilt surface 42 of quadrant 26. Thus, C-shaped recess 82, formed by boot-shaped extension 78, biases radial projection 54 and, in turn, inertial actuator 50 in a counter-clockwise direction into the "normal" position shown in FIG. 1. As such, a gap 106 is formed between stop surface 44 of quadrant 26 and an engaging finger 108 of inertial actuator 50 when in this normal position thereby enabling emergency release lever 60 to be raised (i.e., rotated in a counter-clockwise direction) without also lifting the seatback.

Figure 2:
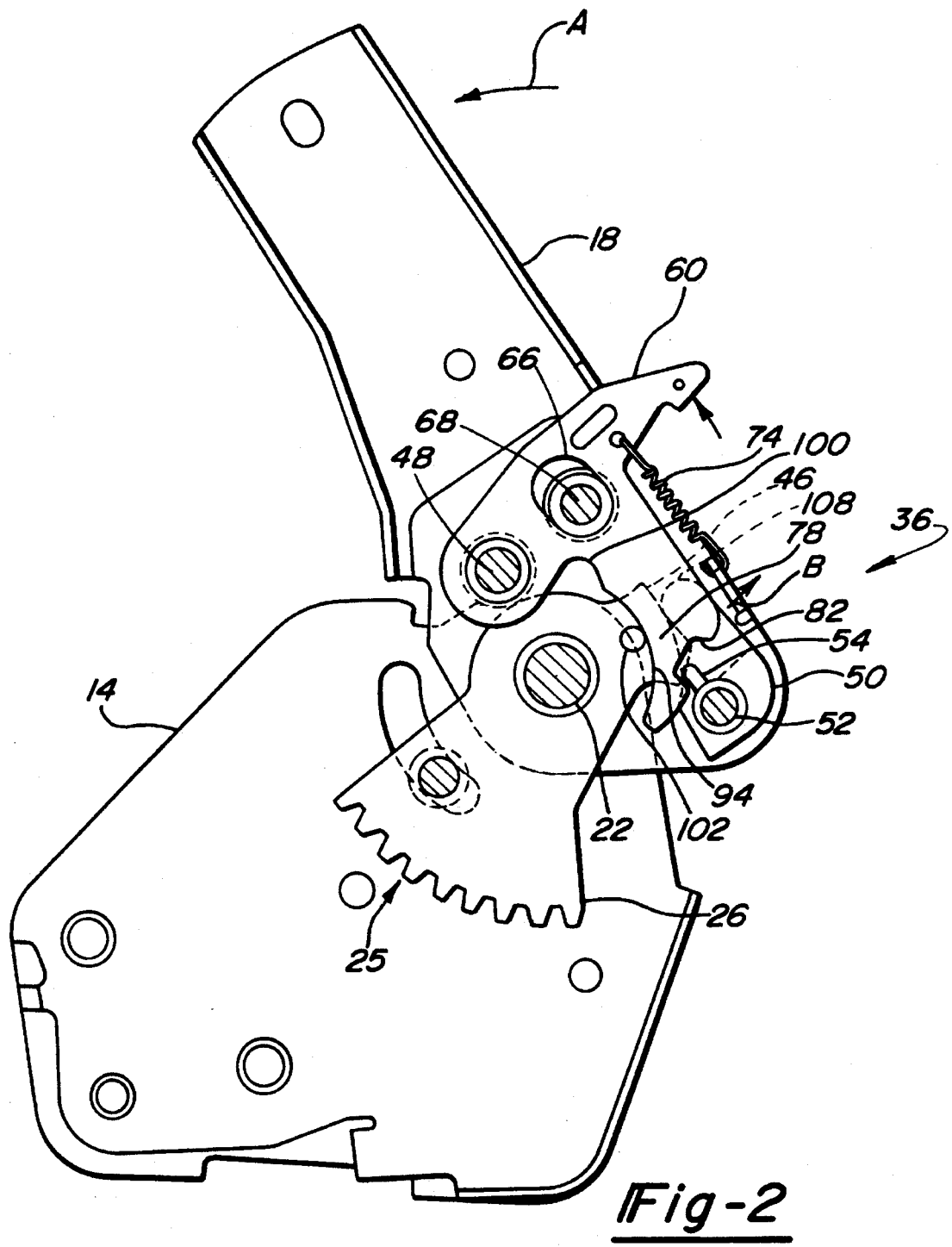
FIG. 2 is a side elevational view of the seat hinge mechanism of FIG. 1 with an upper hinge member rotated forward and an inertial actuator in a disengaged position.

With reference now to FIG. 2, when upper hinge member 18 is tilted forwardly about pivot pin 22 due to a passenger desiring access behind the vehicle seat, pin 102 on quadrant 26 initially engages U-shaped recess 100 and then biases emergency release lever 60 in a horizontally rearward direction. Concurrently, C-shaped recess 82 of boot-shaped extension 78 releases the biased pressure exerted on projection 54 of inertial actuator 50. Since the center of gravity of inertial actuator 50 is above and horizontally rearward of pin 52, inertial actuator 50 initially rotates due to gravity in a clockwise direction towards a "disengaged" position. Further forward rotation of the seatback causes pin 102 to engage arcuate surface 94 or release lever 60 and inertial actuator 50 continues rotating clockwise (relative to forwardly tilting upper hinge member 18) an amount sufficient to allow engaging finger 108 on inertial actuator 50 to clear stop surface 44. As the seatback is rotated further in a forward direction, as indicted by arrow "A", C-shaped recess 82 engages inertial actuator projection 64, and engaging finger 108 slides along a top surface of quadrant extension 46 to rotate inertial actuator 50 in a direction indicated by arrow "B" for preventing inertial actuator 50 from obstructing further rotation of the seatback. Deflection of biasing spring 74 may occur (depending upon the curvature of arcuate surface 94) when arcuate surface 94 slidingly engages pin 102 as the seatback is rotated toward a forwardly folded position.

Thereafter, as the seatback is rotated in a clockwise direction to return the seatback to its non-folded upright position, pin 102 engages arcuate surface 94 as engaging finger 108 slides along quadrant extension 46. Thus, as engaging finger 108 slides along stop surface 44, C-shaped recess 82 engages projection 54 and seat hinge assembly 10 returns to the upright position shown in FIG. 1.

Figure 3:
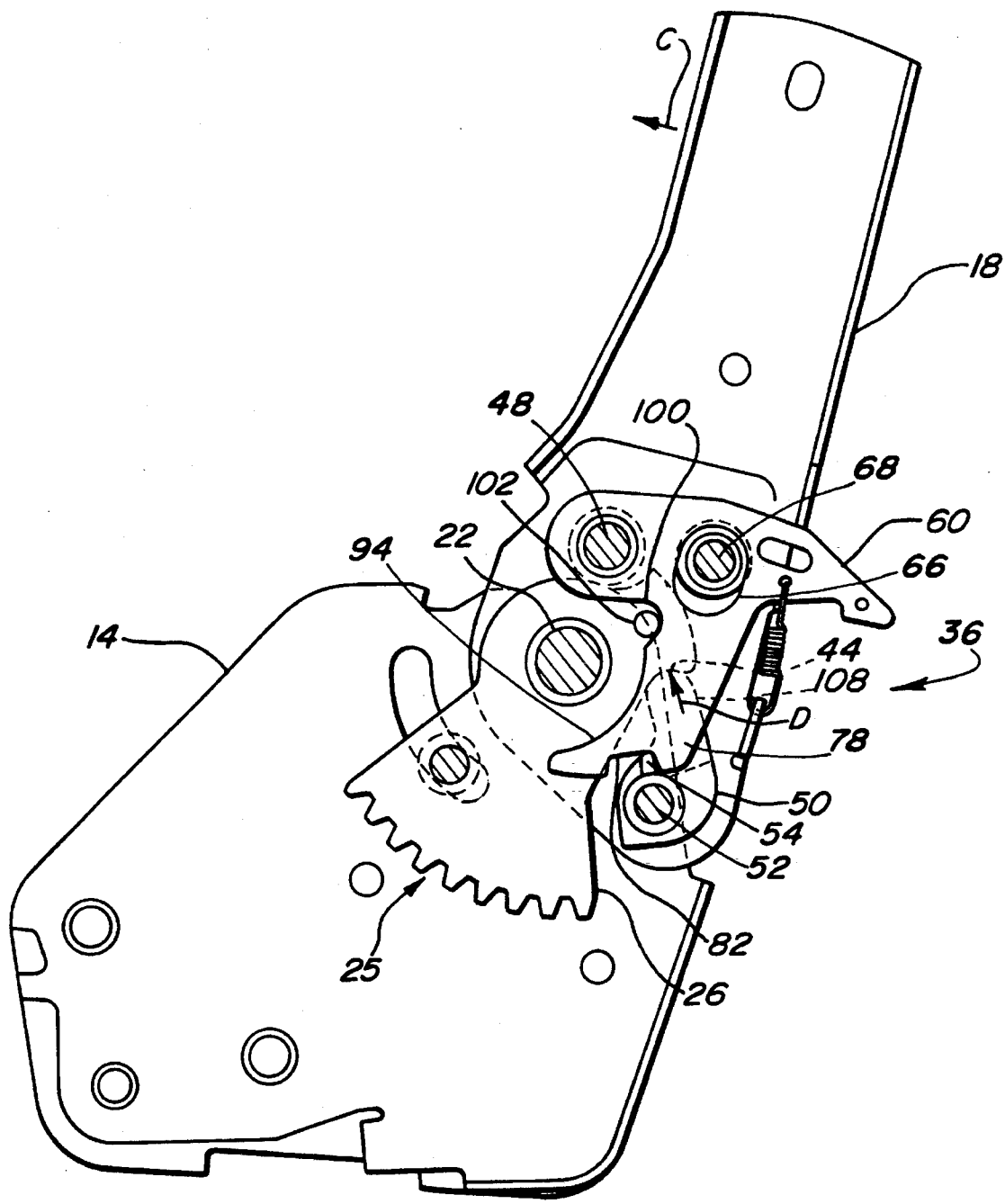
FIG. 3 is a side elevational view of the seat hinge mechanism of FIG. 1 with the inertial actuator in an engaged position.

With particular reference now to FIG. 3, when upper hinge member 18 begins tilting forward in a direction indicated by arrow "C" about pivot pin 22 in response to the vehicle seat being subjected to deceleration forces exceeding a predetermined maximum level (caused by collision, an emergency stop, etc.), pin 102 initially engages U-shaped recess 100 which, then biases emergency release lever 60 a small distance in a horizontally rearward direction. As such, C-shaped recess 82 releases pressure on inertial actuator 50. However, since the deceleration force is present and the center of gravity is above and horizontally rearward of pin 52, inertial actuator 50 tends to rotate against quadrant 26 in a counter-clockwise direction into an "engaged" position such that engaging finger 108 contacts stop surface 44 in a direction indicated by arrow "D" for preventing continued forward pivoting movement of upper hinge member 18. The predetermined deceleration force required to cause inertial actuator 50 to rotate counter-clockwise is typically about 0.3 g and greater.

As can be appreciated, seat hinge mechanism 10 of the present invention incorporates many advantageous features. Inertial actuator 50 regularly moves between the "normal" position, the "engaged" position, and the "disengaged" position during use for reducing the likelihood that corrosion or other foreign matter would interfere with the free movement thereof. Moreover, toe portion 84 helps maintain emergency release lever 60 on side surface 86 of quadrant 26, despite force imbalances which may occur. When seat hinge mechanism 10 is in the "normal" position, gap 106 formed between stop surface 44 of quadrant 26 and engaging finger 108 of inertial actuator 50 enables emergency release lever 60 to be raised without also lifting the seatback. In addition, emergency release lever 60 moves inertial actuator 50 back into the normal position not quadrant 26. More particularly, pin 102 positively moves emergency release lever 60 which enables inertial actuator 50 to rotate out of engagement with quadrant 26. The inertial actuator is positioned in the "normal", "engaged" and "disengaged" positions by the emergency release lever, not by the quadrant. Such design considerations decrease parts and reduce rattling during use.

In use, seat hinge mechanism 10 is normally positioned as shown in FIG. 1 with the seatback in the upright position. If a passenger desires access behind the seat, the seatback can be pivoted forward (as can be seen in FIG. 2) by simply moving the seatback forward without actuating any manual latches. The seat can be returned to the upright position simply by moving the seatback into the upright position. When the seat is in the upright position and the seat experiences deceleration forces above the predetermined threshold level, the inertial actuator engages the stop surfaces and forward pivoting of the seatback is prevented. The emergency release lever can be used to release the inertial actuator to allow the seat to be pivoted into the folded position.

While the above description constitutes the preferred embodiment of the present invention, it is to be understood that the invention is readily susceptible to modification, variation and change without departing from the proper scope and fair meaning of the accompanying claims.

What is claimed is:

1. In a seat hinge mechanism operable for permitting rotation of a seatback relative to a seat bottom under normal use conditions and preventing such rotation when predetermined deceleration forces are exerted thereon, said seat hinge mechanism including a lower hinge member connected to said seat bottom and an upper hinge member connected to said seatback and rotatable with respect to said lower hinge member about a pivot, and an inertial sensing latch assembly, said inertial sensing latch assembly comprising:

stop means operatively connected to said lower hinge member for defining first and second stop surfaces, wherein said first stop surface limits rotation of said upper hinge member in one direction;

an inertial actuator rotatable with respect to said upper hinge member and including means for engaging said second stop surface when said upper hinge member rotates in an opposite direction due to said predetermined deceleration forces, and a projection offset from a center of rotation, wherein said inertial actuator has a center of gravity above and horizontally spaced from said center of rotation;

release lever means pivotally connected by a pivot pin to said upper hinge member for engaging said projection to rotate said inertial actuator into a normal position against said stop means when said upper hinge member is fully rotated against said first stop surface, said release lever means including a first bore spaced from said pivot pin for receiving a first pin connected to said upper hinge member; and biasing means interconnected with said release lever means for biasing said release lever means to release said projection when said upper hinge member is rotated in said opposite direction and to allow said inertial actuator to rotate by gravity if said predetermined deceleration forces are not present.

2. The inertia sensing latch assembly of claim 1 wherein said stop means is a component of a reclining mechanism permitting reclining movement of said seatback relative to said seat bottom.

3. The inertia sensing latch assembly of claim 1 wherein said release lever means is rotatable between first and second positions and includes cam means for receiving a second pin connected to said upper hinge member, and wherein said cam means includes first and second edges defining said first and second positions.

4. The inertia sensing latch assembly of claim 3 wherein said release lever means includes an elongated extension having a recess formed at its distal end and within which said projection on said inertial actuator is located for moving said inertial actuator into said normal position.

5. The inertia sensing latch assembly of claim 4 wherein said elongated extension of said release lever means has an end portion which engages a side surface of said stop means to maintain proper orientation of said release lever means and said stop means as said upper hinge member is rotated fully in said one direction and in said opposite direction.

6. The inertia sensing latch assembly of claim 4 wherein said biasing means slidingly engages an arcuate surface defined by said elongated extension of said release lever means as said upper hinge member is rotated in said opposite direction.

7. The inertia sensing latch assembly of claim 6 further including a spring means having one end connected to said release lever means and an opposite end connected to said upper hinge member for normally biasing said release lever means into said first position.

8. The inertia sensing latch assembly of claim 7 wherein said arcuate surface biases said release lever means into said second position and said recess engages said projection of said inertial actuator when said upper hinge member is rotated fully in said opposite direction and when said predetermined deceleration forces are not present.

9. The inertia sensing latch assembly of claim 1 wherein said engaging means and said second stop surface form a gap therebetween when said seat hinge mechanism is in said normal position to allow said release lever means to be raised without also lifting said seatback.

10. The inertia sensing latch assembly of claim 1 wherein said stop means includes an extension defining said first and second stop surfaces on opposite sides thereof, and wherein said biasing means includes a second bore located on said extension between said first and second stop surfaces for receiving a biasing pin.

11. The inertia sensing latch assembly of claim 10 wherein said first pin engages said first stop surface when said seatback is rotated in said one direction.

12. In a seat hinge mechanism having a lower hinge member connected to a seat bottom and an upper hinge member connected to a seatback and rotatable with respect to said lower hinge member about a pivot, and an inertia sensing latch assembly for allowing rotation of said seatback relative to said seat bottom under normal use conditions and preventing such rotation when predetermined deceleration forces are present, said inertia sensing latch assembly comprising:

stop means operatively associated with said lower hinge member for defining first and second stop surfaces, wherein said first stop surface limits rotation of said upper hinge member in one direction;

an inertial actuator rotatable with respect to said upper hinge member and including means for engaging said second stop surface when said upper hinge member rotates in an opposite direction due to said predetermined deceleration forces, and an actuator projection offset from a center of rotation, wherein said inertial actuator has a center of gravity above and horizontally spaced from the center of rotation;

release lever means pivotally connected by a pivot pin to said upper hinge member for engaging said actuator projection to rotate said inertial actuator into a normal position against said stop means when said upper hinge member is fully rotated against said first stop surface, said release lever means having a first bore spaced from said pivot pin which receives a first pin connected to said upper hinge member such that said release lever means is rotatable about said first pin between first and second positions, said release lever means includes cam means for receiving a second pin connected to said upper hinge member with said cam means having first and second edges defining said first and second positions; and biasing means acting on said release lever means for biasing said release lever means to release said actuator projection when said upper hinge member is rotated in said opposite direction and to allow said inertial actuator to rotate in one direction by gravity if said predetermined deceleration forces are not present.

13. The inertia sensing latch assembly of claim 12 wherein said release lever means includes an elongated projection having a C-shaped recess formed at its distal end.

14. The inertia sensing latch assembly of claim 13 wherein one end of said C-shaped recess engages said actuator projection to rotate said inertial actuator into a normal position when said upper hinge member is rotated fully in said one direction, and wherein said inertial actuator initially rotates due to gravity towards a disengaged position when said upper hinge member is initially rotated in said opposite direction and thereafter said biasing means forces an opposite end of said C-shaped recess against said actuator projection to rotate said inertial actuator into a disengaged position when said predetermined deceleration forces are not present.

15. The inertia sensing latch assembly of claim 14 wherein said inertial actuator includes an engaging finger adapted to engage said second stop surface when said upper hinge member initially rotates in said opposite direction due to said predetermined deceleration forces and thereafter prevents further rotation of said upper hinge member in said opposite direction.

16. In an inertia-sensitive seat hinge mechanism operable for allowing rotation of a seatback relative to a seat bottom under normal use conditions and preventing such relative rotation therebetween when predetermined deceleration forces are present, said inertia-sensitive seat hinge mechanism including a lower hinge member connected to said seat bottom and an upper hinge member connected to said seatback and rotatable with respect to said lower hinge member about a pivot, and an inertia sensing latch assembly, said inertia sensing latch assembly comprising:

stop means associated with said lower hinge member for defining first and second stop surfaces, wherein said first stop surface limits rotation of said upper hinge member in one direction;

an inertial actuator rotatable with respect to said upper hinge member and including means for engaging said second stop surface when said upper hinge member rotates in an opposite direction due to said predetermined deceleration forces, and an actuator projection offset from a center of rotation, wherein said inertial actuator has a center of gravity above and horizontally spaced of said center of rotation;

release lever means for engaging said actuator projection to rotate said inertial actuator into a normal position against said stop means, said release lever means being pivotally mounted about a pivot pin to said upper hinge member and having a bore spaced from said pivot pin which receives a first pin extending from said upper hinge member and said release lever means including a first edge surface defining a recess in which said projection is retained to rotate said inertial actuator into said normal position when said upper hinge member is rotated fully in said one direction against said first stop surface; and biasing means interconnecting said release lever means to said upper hinge member for biasing said release lever means to release said actuator projection when said upper hinge member is rotated in said opposite direction and to allow said inertial actuator to rotate by gravity if said predetermined deceleration forces are not present.

17. The inertia sensing latch assembly of claim 16 wherein said release lever means includes an elongated extension having a forward end portion which overlays a side surface of said stop means to maintain proper orientation of said release lever means and said stop means as said upper hinge member rotates fully in said one direction and in said opposite direction.

* * * * *